United States Patent [19]

Landsness

[11] Patent Number: 4,780,170
[45] Date of Patent: Oct. 25, 1988

[54] DRUM LIFTING DEVICE

[75] Inventor: Clifford A. Landsness, Akron, Ohio

[73] Assignee: The Uniroyal Goodrich Tire Company, Akron, Ohio

[21] Appl. No.: 845,667

[22] Filed: Mar. 28, 1986

Related U.S. Application Data

[63] Continuation of Ser. No. 649,886, Sep. 13, 1984, abandoned.

[51] Int. Cl.4 .............................................. B29D 30/26
[52] U.S. Cl. ...................................... 156/416; 156/415
[58] Field of Search ............... 156/398, 400, 416, 417, 156/415, 420, 110.1, 135

[56] References Cited

U.S. PATENT DOCUMENTS

| 4,007,081 | 2/1977 | Mallory | 156/417 |
| 4,290,472 | 9/1981 | Bryant | 156/416 |

FOREIGN PATENT DOCUMENTS

| 0975447 | 10/1977 | U.S.S.R. | 156/416 |
| 1032394 | 6/1966 | United Kingdom | 156/416 |

*Primary Examiner*—David Simmons
*Assistant Examiner*—Ramon R. Hoch
*Attorney, Agent, or Firm*—Alan A. Csontos; Michael J. Colitz, Jr.

[57] ABSTRACT

A tire building machine that allows for free axial movement of positioned beads towards a tire drum during expansion of the tire drum. The axial movement of the bead is effected by a rubber sleeve that envelops the tire drum and a pair of bead carrier assemblies, each one located axially outwardly of the drum. Subsequent to positioning the bead in a tire building process, the beads are locked into place by means attached to each of the bead carrier assemblies. Expansion of the drum causes the sleeve to effect inwardly axial movement of the bead carrier assemblies toward the drum carrying the tire beads towards the drum, and retraction of the drum causes outwardly axial movement of the bead carrier assemblies away from the drum.

1 Claim, 4 Drawing Sheets

DRUM LIFTING DEVICE

This is a continuation, of application Ser. No. 06/649,886, filed Sept. 13, 1984, now abondoned.

BACKGROUND OF THE INVENTION

The invention relates to tire building apparatus and particularly to such apparatus which includes an expandable and retractable tire building drum with axially movable bead carrier assemblies positioned at the ends of the drum.

A tire building apparatus as described, for example, in U.S. Pat. No. 4,007,081 comprises a radially expandable cylindrical drum, a pair of axially movable bead carrier assemblies, one at each end of the drum, and fluid actuated means which positively drives or move the carrier assemblies axially toward and away from the ends of the drum. Each of the carriers includes radially outwardly movable bead lock clamps which are also positively driven or moved.

When building a tire on such a tire building apparatus the components of a tire carcass are arranged around the exterior of the drum and carrier assemblies and tire beads are placed over the carcass on each carrier assembly. The bead lock clamps are actuated to move radially outwardly to lock and support the beads in position on the tire carcass. The drum is then expanded radially outwardly while a shaft is rotated by an air actuated clutch to positively move each carrier assembly axially inwardly towards the ends of the drum to allow expansion of the drum. After completion of building the tire (e.g. by placing the belt assembly and tread around the expanded drum), the drum is retracted and the carriers are returned to their original locations when the air actuated clutch rotates the shaft in the opposite direction.

To positively move each carrier assembly axially inwardly toward the ends of the drum or axially outwardly away from the ends of the drum requires separate actuation devices to move each carrier assembly and energy in the form of air pressure to operate such devices.

SUMMARY OF THE INVENTION

It is an object of the present invention to make a tire building apparatus comprising a radially expandable and retractable drum and a pair of axially movable bead carrier assemblies that operate with more energy efficiency and which require less maintenance.

The tire building apparatus of the present invention comprises an expandable and retractable tire building drum and a pair of bead carrier assemblies which are adapted for axial movement to and from the ends of the drum in a more simplified manner. Each bead carrier assembly comprises a bearing means that allows each carrier assembly to react or respond directly to the expansion and retraction of the drum, so that movement of each carrier assembly to and from the drum is achieved without the need for a positive drive or actuation means. A rubber sleeve envelops the drum and the bead carrier assemblies.

In the present invention, the radial expansion and retraction of the drum directly effects axial movement of the bead carrier assemblies. As the drum is expanded outwardly, the bead carrier assemblies are axially pulled towards the drum by the rubber sleeve surrounding the bead carriers and the drum. When retracted, the carriers are pushed axially away from the drum by the rubber sleeve Each bead carrier assembly comprises a bearing means made up of plurality of shaft enclosures attached to each carrier assembly, and each enclosure is supported on a guide shaft by a plurality of bearings. Each guide shaft is attached to the drum as well as a carrier assembly. The bearing means allows free axial movement of the carrier assembly toward and away from the drum.

As the rubber sleeve expands with the drum expansion, the sleeve axially pulls each bead carrier assembly along the bearing means toward the drum. Each bearing means includes a flange located on the axial inner side of the bearing means to stop the inward movement of each carrier assembly when the flanges abut against the drum, establishing an axial inner position of the bead carrier assemblies.

The tire building apparatus of the present invention is a less complicated structure and, therefore, is less expensive and more maintenance free. Because positive drive for axial movement of the carriers has been eliminated, operation of the apparatus requires less energy. The elimination of separate actuators also reduces possibilities of machine operator error.

DETAILED DESCRIPTION

Figure 1:
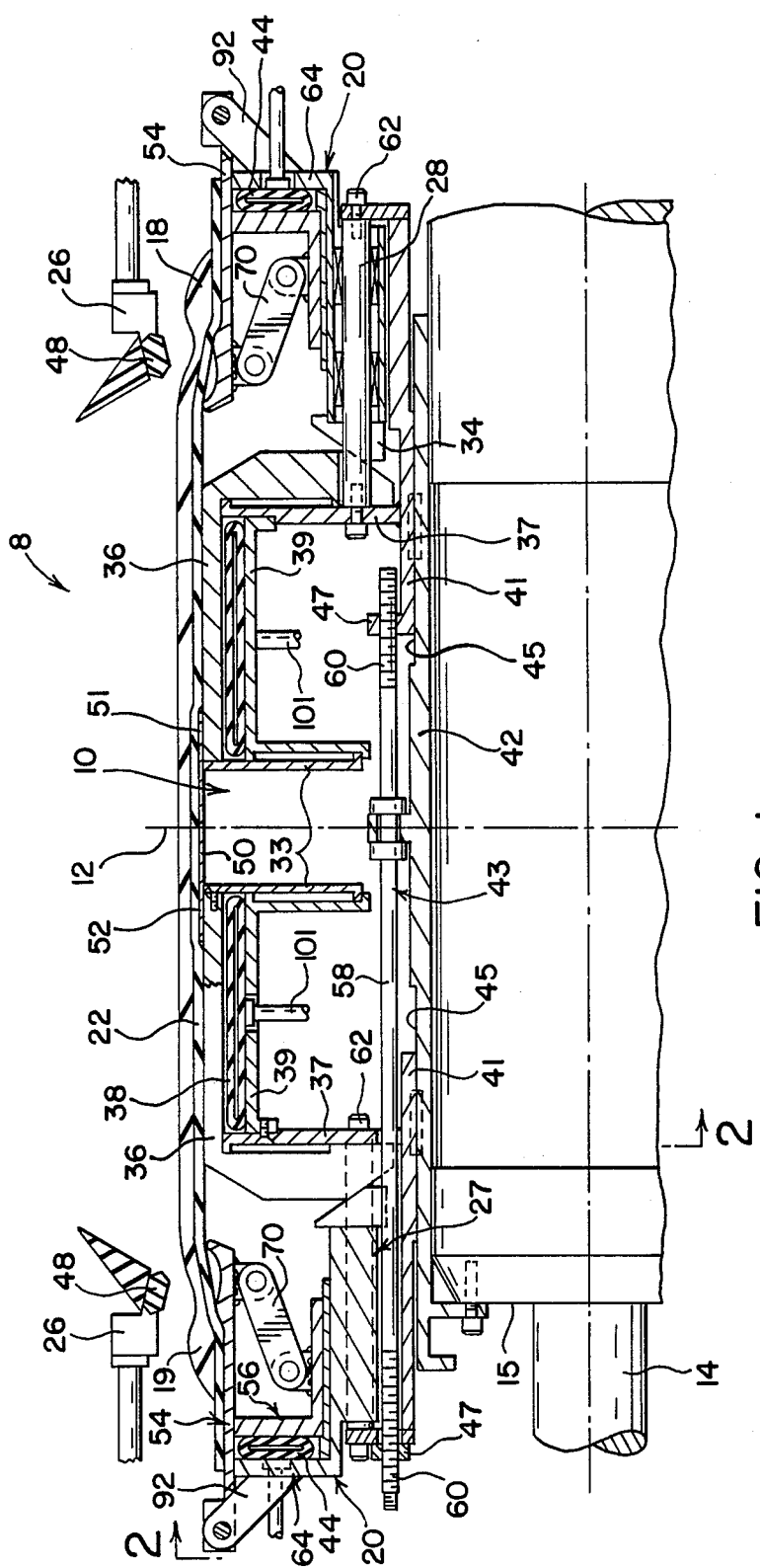
FIG. 1 is a longitudinal sectional view of a tire building apparatus in a retracted condition with parts shown in section, broken away or omitted.

In FIG. 1 a tire building apparatus 8 according to the invention is shown in a presently preferred embodiment. The apparatus comprises an expandable and retractable drum 10 shown in a retracted position and a pair of bead carrier assemblies 20 in their axially outermost position away from the drum 10. The drum 10 is symmetrical about a transverse center plane 12 and concentric about a central shaft 14. The pair of bead carrier assemblies 20, one located on each side of the drum 10, are concentric about the central shaft 14. A rubber sleeve 22 covers the drum 10 and both bead carrier assemblies 20 and forms the building surface of the apparatus 8.

The drum 10 is supported on the central shaft 14 by a table 42. The table 42 is bolted to one end face 15 of an enlarged portion of the central shaft 14 as shown in FIG. 1. Mounted on each end of the table 42 is a cylindrical sleeve 41 capable of sliding axially inwardly or axially outwardly on a recessed portion 45 of the table 42. The pair of cylindrical sleeves 41 can be axially adjusted to accommodate various tire sizes by an adjustment mechanism 43. The adjustment mechanism 43 comprises a rod 58 with threads 60 on each end. The rod 58 is threaded through extensions 47 of the cylindrical sleeves 41. The rotation of the rod 58 will move the sleeves 41 inwardly toward the drum 10 or outwardly away from the drum 10.

An annular drum guide 37 is welded or otherwise secured to each cylindrical sleeve 41. Attachments to each annular drum guide 37 are similar and the attachments to one guide 37 will be described herein. Bolted or otherwise secured to each guide 37 is a cylindrical bladder support 39 that functions as a support for a drum bladder 38. Each drum bladder 38 is inflated from a fluid source (not shown) through fluid inlets 101. Mounted on each guide 37 is a plurality of annularly spaced drum surface members 36. Bolted perpendicularly to each drum surface members 36 is an annular guide ring 33. The guide ring 33 positions each surface member 36 relative to the annular drum guide 37.

A plurality of spacers 50 is located on the drum surface members 36 to allow for axial adjustment of the drum 10. Each spacer 50 has two ends 51 and 52. The one end 51 of the spacer 50 is secured to one of the drum surface members 36. The other end 52 of the spacer 50 overlaps an axially corresponding drum surface member 36.

Figure 4:
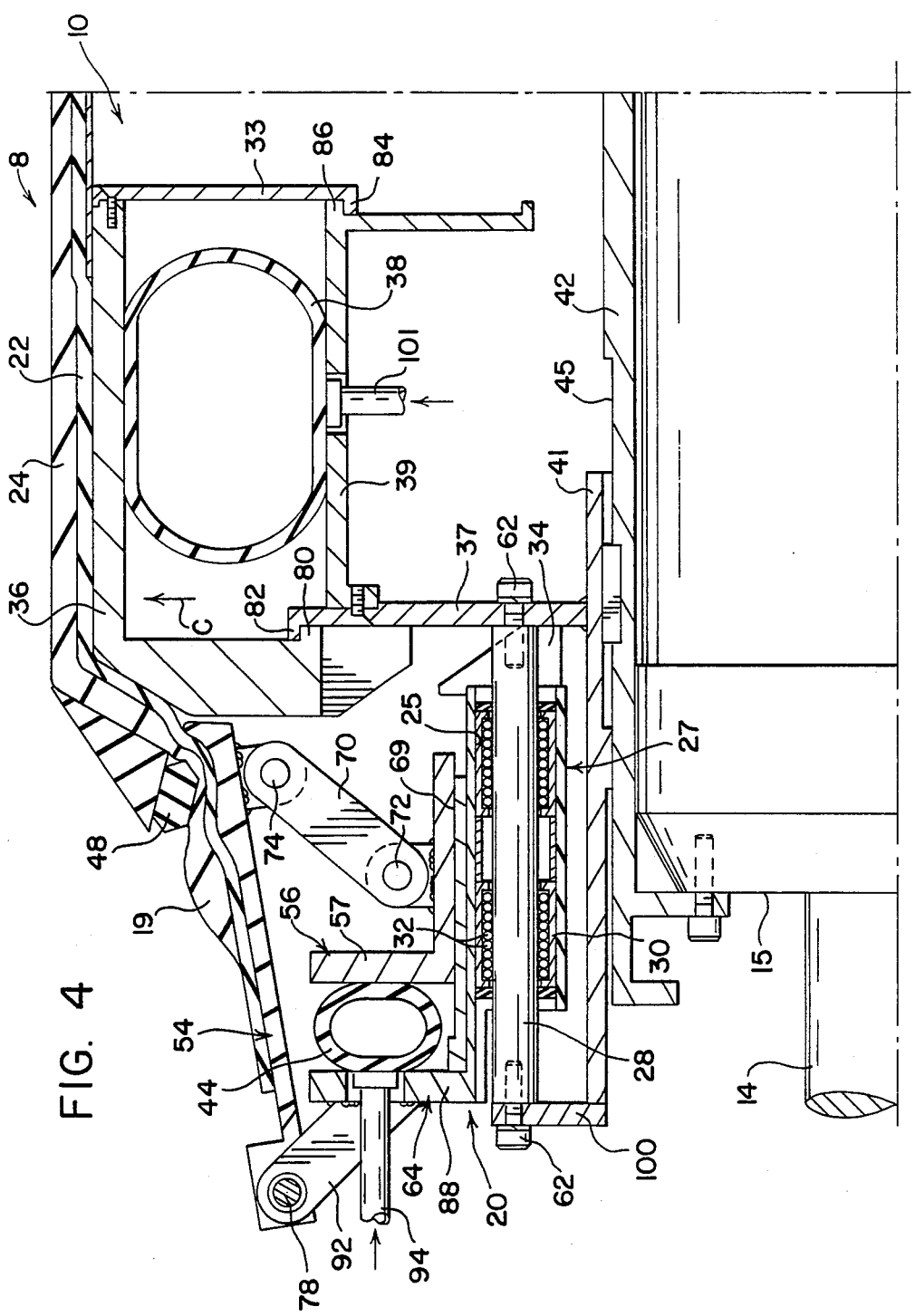
FIG. 4 is an enlarged longitudinal sectional view like that of FIG. 3 with the drum in another expanded condition.

The drum 10 expands and retracts when the two bladders 38 are inflated or deflated. When a bladder 38 is inflated as shown in FIG. 4, the bladder 38 pushes the plurality of drum surface members 36 radially outwardly. Each drum surface member 36 is guided by the guide 37 and the cylindrical bladder support 39. The radially outward movement of the drum surface members 36 is limited when a lip 80 of each drum surface members 36 contacts lip 82 of each annular drum guide 37 and a lip 84 of each annular guide ring 33 contacts the lip 86 of each cylindrical bladder support 39. When the bladders 38 deflate, the drum surface members 36 retract radially inwardly to their original position by the tension of the rubber sleeve 22.

In accordance with this invention, the tire building apparatus further includes a pair of bead carrier assemblies 20 that can move axially to and from the drum 10 without the need for a positive drive device or mechanism. Each of the bead carrier assemblies 20 are similar and only one need be described in detail herein.

Figure 2:
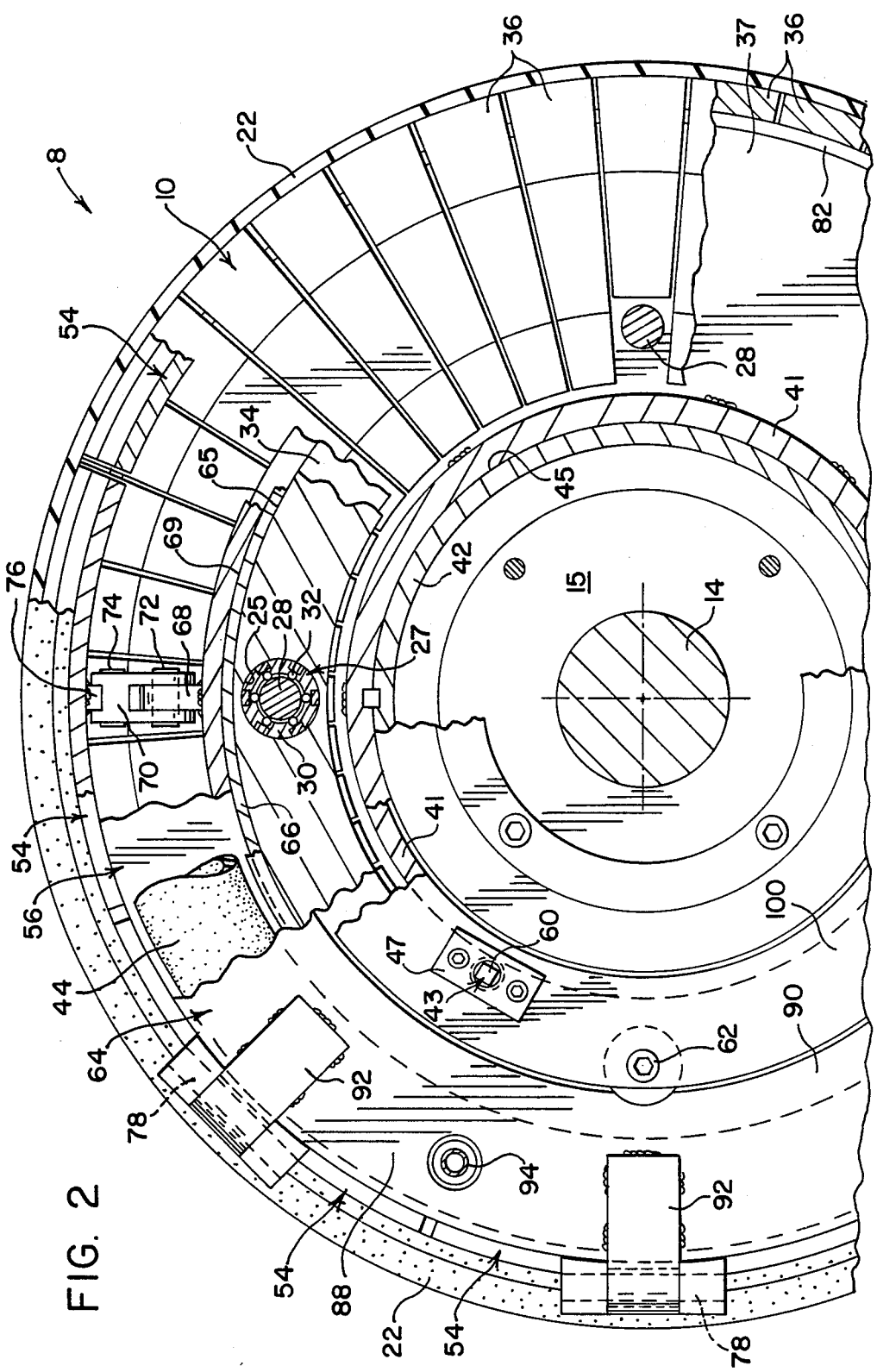
FIG. 2 is an end view taken along the line 2—2 in FIG. 1 of a tire building machine of FIG. 1.

Each bead carrier assembly 20 comprises a floating segment holder 64, a bearing means 27 and a plurality of bead locating segments or clamps 54. A partial end view of the floating segment holder 64 is shown in FIG. 2. The floating segment holder 64 serves as a holder for both the bearing means 27 and the plurality of bead locating segments 54. In addition, the floating segment holder 64 is adapted to move or "float" on the bearing means 27 axially towards the drum 10 and axially away from the drum 10.

Figure 3:
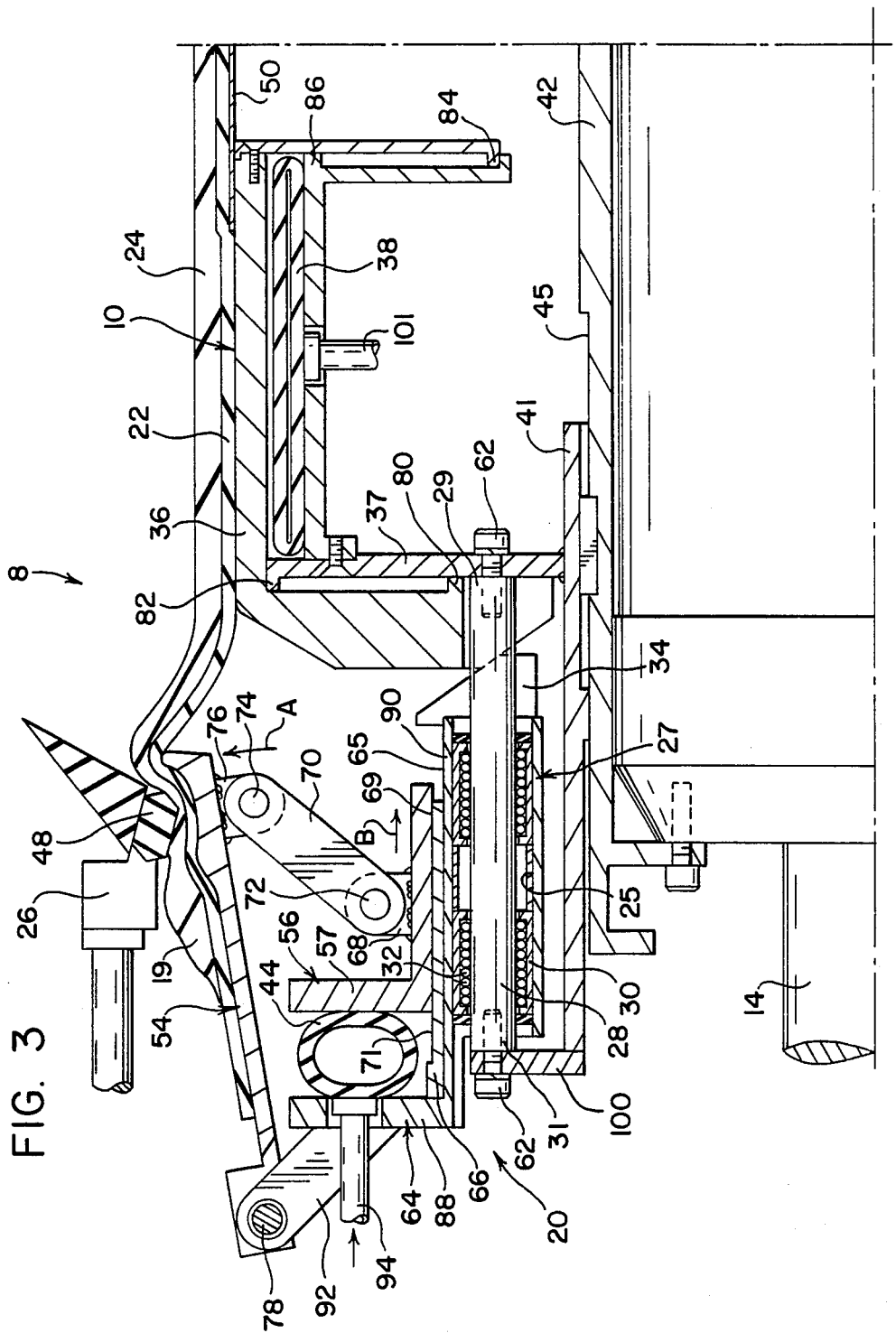
FIG. 3 is an enlarged longitudinal sectional view of a left-hand portion of FIG. 1 showing the apparatus in one expanded condition.

As seen in FIGS. 2 and 3, each floating segment holder 64 comprises an annular plate 88 with an annular bearing support ring 90 attached thereto. The annular ring 90 of each floating segment holder 64 further has bearing means support bores 25 and a peripheral surface 65. Also attached to the annular plate 88 are eight arms 92 extending outwardly. One arm 92 is shown in FIG. 3. Attached to each arm 92 by a pin 78 is a bead locating segment 54.

An annular bladder 44 is disposed axially inwardly of the annular plate 88 of each floating segment holder 64. A fluid inlet 94 registers through the annular plate 88 into the bead bladder 44. The inlet 94 conveys air to the bladder 44 from a fluid source (not shown) for inflation of the bladder 44 and exhausts air from the bladder 44 for deflation of the bladder 44. The fluid inlet 94 also serves to hold the bladder 44 in place.

Each bearing means 27 comprises guide shaft enclosures 30. Each enclosure 30 is held in a corresponding bore 25 by conventional means such as setscrews. Each guide shaft enclosure 30 surrounds a guide shaft 28. Located between each guide shaft enclosure 30 and the corresponding guide shaft 28 is a plurality of ball bearings 32. Bearing means such as 27 comprising the guide shaft enclosures 30 guide shafts 28, and pluralities of bearings 32 are often referred to as linear bearings.

The four guide shafts 28 of bearing means 27 are individually attached to both the drum 10 and the bead carrier assembly 20. FIG. 3 shows one such guide shaft having an inner end 29 against the drum 10 and an outer end 31 adjacent a bead carrier assembly 20. Inner end 29 of guide shaft 28 is bolted through an annular drum guide 37 by a bolt 62 threaded into end 29 of the guide shaft 28. Outer end 31 of each guide shaft 28 is bolted to a radial flange 100 on the cylindrical sleeve 41 by another bolt 62 threaded into the outer end 31 of the guide shaft 28.

Attached to each bore 25 is a flange 34. The flanges 34 serve to stop inward axial movement of each bead carrier assembly 20 when the flange 34 about the annular drum guide 37. Each peripheral surface 65 of ring 90 supports a cylindrical floating sleeve 66. The sleeve 66 has a recessed portion 71 along its smooth outer surface 69.

Mounted on the smooth surface 69 of sleeve 66 is a L-shaped annular support 56. Mounted on the support 56 are eight bead locking segments 54.

The support 56 is slidable on surface 69 of sleeve 66 and has a radially projecting plate 57. The annular bladder 44 is in operative contact with the plate 57.

The slidable support 56 is connected to a bead locating segment 54 by a pivot arm 70. Each pivot arm 70 is attached to the support 56 by a pin 72 attaching the pivot arm 70 to a mounting bracket 68 on the support 56. In addition, each pivot arm 70 is attached to a bead locating segment 54 by another pin 74 attaching the pivot arm 70 to a mounting bracket 76 on the segment 54. Each segment 54 is attached to a corresponding arm 92 of each floating segment holder 64 by another pin 78.

With the above-described configuration of each bead carrier assembly 20, when the annular bladder 44 is inflated to push the support 56 towards the drum 10 as indicated by arrow B, pivot arm 70 mounted onto the support 56 and the segment 54 cause outward radial movement of the bead segment 54 as indicated by arrow A in FIG. 3.

Building a tire on apparatus 8 begins by placing the tire carcass 24 over the rubber sleeve 22. The carcass 24 usually comprises one or more plies of cord reinforced rubber material. The carcass may be reinforced by any one of the known fabric reinforcement materials or may be fiberglass or metal. After the carcass 24 is built, two beads 48 are set into place, one at each end of the carcass 24 and radially outwardly of the bead locating segments 54 by a pair of bead setters 26 each located at each outer end of the bead carrier assemblies 20.

In FIG. 3 there is shown a sectional view of the tire building apparatus with the annular bladder 44 inflated causing the support 56 to slide through pivot arm 70 to move the bead locating segments 54 radially outwardly to clamp the bead 48 and to clamp the tire carcass 24 between the bead 48 and the segments 54.

The next step in the tire building process involves the expansion of the drum 10 as shown by arrow C in the sectional view of the tire building apparatus 8 in FIG. 4.

The drum bladders 38 are inflated causing radially outward movement of the drum surface members 36 along the bladder support 39. This causes the rubber sleeve 22 and the tire carcass 24 thereon to expand radially outwardly. As the drum 10 expands radially outwardly, the rubber sleeve 22 pulls each bead carrier assembly 20 towards the drum 10 until the flanges 34 contact the annular drum guide 37. The clamped tire carcass 24 aids the rubber sleeve 22 in pulling each carrier assembly 20 toward the drum 10. The expanded drum bladders 38 will secure the tire carcass 24 and the beads 48 in this expanded position. At this stage, in a conventional manner, the beads 48 are enclosed by turning ends 18 and 19 of the tire carcass 24 axially over the beads 48.

When the tire carcas 24 is ready for removal from the tire building apparatus 8, the drum bladders 38 and the bladders 44 are deflated. The deflation of the drum bladders 38 cause the drum surface members 36 and ruber sleeve 22 to retract radially inwardly. The retraction of the rubber sleeve 22 pushes the bead carrier assemblies 20 axially outwardly, away from the drum 10. The deflation of the bladders 44 cause the supports 56 to move axially outwardly away from the drum 10 and the bead segments 54 to collapse radially inwardly as shown in the collapsed version of FIG. 1. At this time the tire carcass 24 can be removed from the tire building apparatus 8.

While there has been shown and described a preferred embodiment of the presetn invention, it will be understood by those skilled in the art that various rearrangements and modifications be made therein without departing from the scope of the invention which is to be measured by the accompanying claims.

I claim:

1. A rotatable first stage tire building apparatus to support tire components placed therearound, the apparatus comprising:
   a central shaft defining an axis of rotation of the tire building apparatus;
   a generally cylindrical, retatable, radially expandable and retractable drum;
   means attaching said drum to said central shaft;
   a cylindrical rotatable bead carrier assembly at each end of said drum;
   means attaching each bead carrier assembly to said central shaft;
   a rubber sleeve enveloping said drum and said bead carrier assemblies;
   a radially movable bead ring locating means located on each bead carrier assembly;
   a first inflatable bladder means within said drum to fully expand said drum upon inflation and to fully retract said drum upon deflation;
   bearing means responsive to the inflation of said first inflatable bladder means and drum expansion and to the deflation of said first bladder means and drum retraction to guide the axial movement of said bead carrier assemblies to and from the drum in response to movement of said drum and said rubber sleeve; and
   motion imparting mechanisms including a second annular inflatable bladder means and linkage means movable in response to the inflation and deflation of said second inflatable bladder means to move said bead ring locating means into and out of operative association with bead rings, said linkage means including arms pivotally attached at first ends with respect to said bead carrier assemblies and pivotally attached at second ends with respect to said bead ring locating means.

* * * * *

UNITED STATES PATENT AND TRADEMARK OFFICE
CERTIFICATE OF CORRECTION

PATENT NO. : 4,780,170
DATED : October 25, 1988
INVENTOR(S) : Clifford A. Landsness It is certified that error appears in the above-identified patent and that said Letters Patent is hereby corrected as shown below:

Column 6, line 6, "retatable" should read --rotatable--.

Signed and Sealed this

Thirteenth Day of February, 1990

*Attest:*

JEFFREY M. SAMUELS

*Attesting Officer*         *Acting Commissioner of Patents and Trademarks*